(12) United States Patent
Santoso et al.

(10) Patent No.: US 7,672,227 B2
(45) Date of Patent: Mar. 2, 2010

(54) LOOP PREVENTION SYSTEM AND METHOD IN A STACKABLE ETHERNET SWITCH SYSTEM

(75) Inventors: Ignatius D. Santoso, Thousand Oaks, CA (US); Vincent Magret, Oak Park, CA (US)

(73) Assignee: Alcatel Lucent, Paris (FR)

( * ) Notice: Subject to any disclaimer, the term of this patent is extended or adjusted under 35 U.S.C. 154(b) by 802 days.

(21) Appl. No.: 11/452,173

(22) Filed: Jun. 13, 2006

(65) Prior Publication Data

US 2007/0014234 A1  Jan. 18, 2007

Related U.S. Application Data

(60) Provisional application No. 60/698,605, filed on Jul. 12, 2005.

(51) Int. Cl.
  *H04J 1/16* (2006.01)
  *H04L 12/56* (2006.01)
(52) U.S. Cl. .................. 370/217; 370/230; 370/242; 370/369
(58) Field of Classification Search ......... 370/216–235, 370/369, 375, 380, 242
See application file for complete search history.

(56) References Cited

U.S. PATENT DOCUMENTS

| 6,438,591 | B1 * | 8/2002 | Fehskens et al. ............ 709/223 |
|---|---|---|---|
| 7,061,875 | B1 | 6/2006 | Portolani |
| 2002/0046271 | A1 | 4/2002 | Huang |
| 2003/0012135 | A1 * | 1/2003 | Leroux et al. ............... 370/228 |
| 2005/0073963 | A1 * | 4/2005 | Goodfellow et al. ........ 370/255 |
| 2006/0080417 | A1 * | 4/2006 | Boutboul et al. ............ 709/220 |
| 2008/0291822 | A1 * | 11/2008 | Farkas et al. ................ 370/216 |

FOREIGN PATENT DOCUMENTS

EP  1 528 730  5/2005

OTHER PUBLICATIONS

Cisco Systems: "Spanning-Tree Protocol Enhancements using Loop Guard and BPDU Skew Detection Features"; Cisco.com; URL: http://www.cisco.com/warp/public/473/84.pdf; retrieved Nov 10, 2006; dated May 10, 2005; 7 pages.
EPO Search Report; EP 1 744 489 A1; EP Application No. 06 01 4099; Search Completed Nov 10, 2006; pp. 12-14.

* cited by examiner

*Primary Examiner*—John Pezzlo
(74) *Attorney, Agent, or Firm*—The Capitol Patent & Trademark Law Firm PLLC

(57) ABSTRACT

A stackable Ethernet switch system (SESS) includes a number of stack switch elements in which loops are prevented. In one embodiment, logic is provided for monitoring control management traffic on a stacking port of a stack switch element of the SESS. Also included is logic, operable responsive to determining that there is a loss of control management traffic on a stacking port of a particular switch element of the SESS, for disabling user traffic data on that stacking port while keeping the control management traffic path open. The user data traffic on that stacking port of the particular switch element may be enabled upon detecting that the control management traffic on that stacking port has resumed.

19 Claims, 4 Drawing Sheets

US 7,672,227 B2

LOOP PREVENTION SYSTEM AND METHOD IN A STACKABLE ETHERNET SWITCH SYSTEM

PRIORITY UNDER 35 U.S.C. §119(e) & 37 C.F.R. §1.78

This nonprovisional application claims priority based upon the following prior United States provisional patent application entitled: "USER TRAFFIC LOOP PREVENTION UPON A REMOTE CONTROL PROCESSOR DYSFUNCTION FOR VIRTUAL CHASSIS IN RING CONFIGURATION," application Ser. No. 60/698,605, filed Jul. 12, 2005, in the names of: Ignatius D. Santoso and Vincent Magret, which is hereby incorporated by reference.

CROSS-REFERENCE TO RELATED APPLICATION(S)

This application discloses subject matter related to the subject matter disclosed in the following commonly owned, co-pending patent application(s): (i) "STACK MANAGER PROTOCOL WITH AUTOMATIC SETUP MECHANISM," filed Dec. 29, 2004, application Ser. No. 11/027,886; and (ii) "VIRTUAL CHASSIS EOR CONTINUOUS SWITCHING," filed Dec. 31, 2003, application Ser. No. 10/751,098, wherein the disclosures of both of the above-referenced applications are hereby incorporated by reference in their entireties herein as if set forth in full herein.

BACKGROUND OF THE INVENTION

1. Technical Field of the Invention

The present invention generally relates to communications networks. More particularly, and not by way of any limitation, the present invention is directed to a loop prevention system and method for use with a stackable Ethernet switch system.

2. Description of Related Art

In data communication networks based on the Ethernet technology, packet switches, including multi-layer switches and routers, are used to operatively couple many nodes for purposes of communicating packets of information therebetween. Switches that are made to stand alone without relying on a shared backplane have a plurality of ports and an internal switching fabric for directing inbound packets received at an ingress port to a suitable egress port. In some implementations in the art, the switching capacity is enhanced by linking a plurality of stand-alone switches by operatively linking selected ports (i.e., stack ports) of the switches together so as to create a stackable switch system operable as a single switching entity. Such systems, sometimes called stack switch systems, are often employed together at a customer's premises, e.g., an enterprise.

In a typical implementation, a system of stack switches are operatively interconnected via a pair of designated stack ports present on each switch, also referred to as an element. The system of stack switches is generally coupled in series and the topology of the system is generally characterized by a closed loop called a ring or an open strand of switches referred to herein as a chain. Each of the stack switches is adapted to perform switching between its own data ports as well as the data ports of other stack switches by transmitting packets via the stack ports using stack switch identifiers that facilitate the efficient transmission and switching of these packets to the appropriate stack switch element.

It is known that in certain architectures involving stackable switch elements, looping of user data traffic may occur when the control processor of one of the switch elements becomes dysfunctional. Once a loop in the network is created, the network becomes unusable and requires user intervention to troubleshoot the problem, thereby leading to network downtime and associated inefficiencies.

SUMMARY OF THE INVENTION

Embodiments of the present disclosure are directed to a loop prevention system and method operable in a stackable Ethernet switch system (SESS) having a number of stack switch elements. In general, logic is provided for monitoring control management traffic on a stacking port of a stack switch element of the SESS. Also included is logic, operable responsive to determining that there is a loss of control management traffic on a stacking port of a particular switch element of the SESS, for disabling user traffic data on that stacking port while keeping the control management traffic path open.

One embodiment is directed to a loop prevention method operable in a stackable Ethernet node having at least two stackable switch elements, wherein each switch element includes at least one stacking port and at least one core switch port such that the core switch port is operable to be connected to a core switch. The loop prevention method comprises: monitoring control management traffic on the stacking port of each of the stackable switch elements; and upon determining that there is a loss of the control management traffic on a stacking port of a particular switch element of the stackable node, disabling user data traffic on the stacking port of the particular switch element to avert a loop condition involving the user data traffic in the network environment in which the node is disposed.

Another embodiment is directed to a loop prevention apparatus operable in a stackable Ethernet node having at least two stackable switch elements, wherein each switch element includes at least one stacking port and at least one core switch port such that the core switch port is operable to be connected to a core switch. The loop prevention apparatus comprises: means for monitoring control management traffic on the stacking port of each of the stackable switch elements; and means, operable responsive to determining that there is a loss of the control management traffic on a stacking port of a particular switch element of the stackable node, for disabling user data traffic on the stacking port of the particular switch element to avert a loop condition involving the user data traffic in the network environment in which the node is disposed.

A still further embodiment is directed to a network node operable in an Ethernet environment as a stackable Ethernet switch system, comprising: at least two stackable switch elements, wherein each switch element includes at least one stacking port and at least one core switch port such that the core switch port is operable to be connected to a core switch; logic associated with each stackable switch element for monitoring control management traffic on the stacking port of each of the stackable switch elements; and logic, operable responsive to determining that there is a loss of the control management traffic on a stacking port of a particular switch element of the network node, for disabling user data traffic on the stacking port of the particular switch element to avert a loop condition involving the user data traffic in the network.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
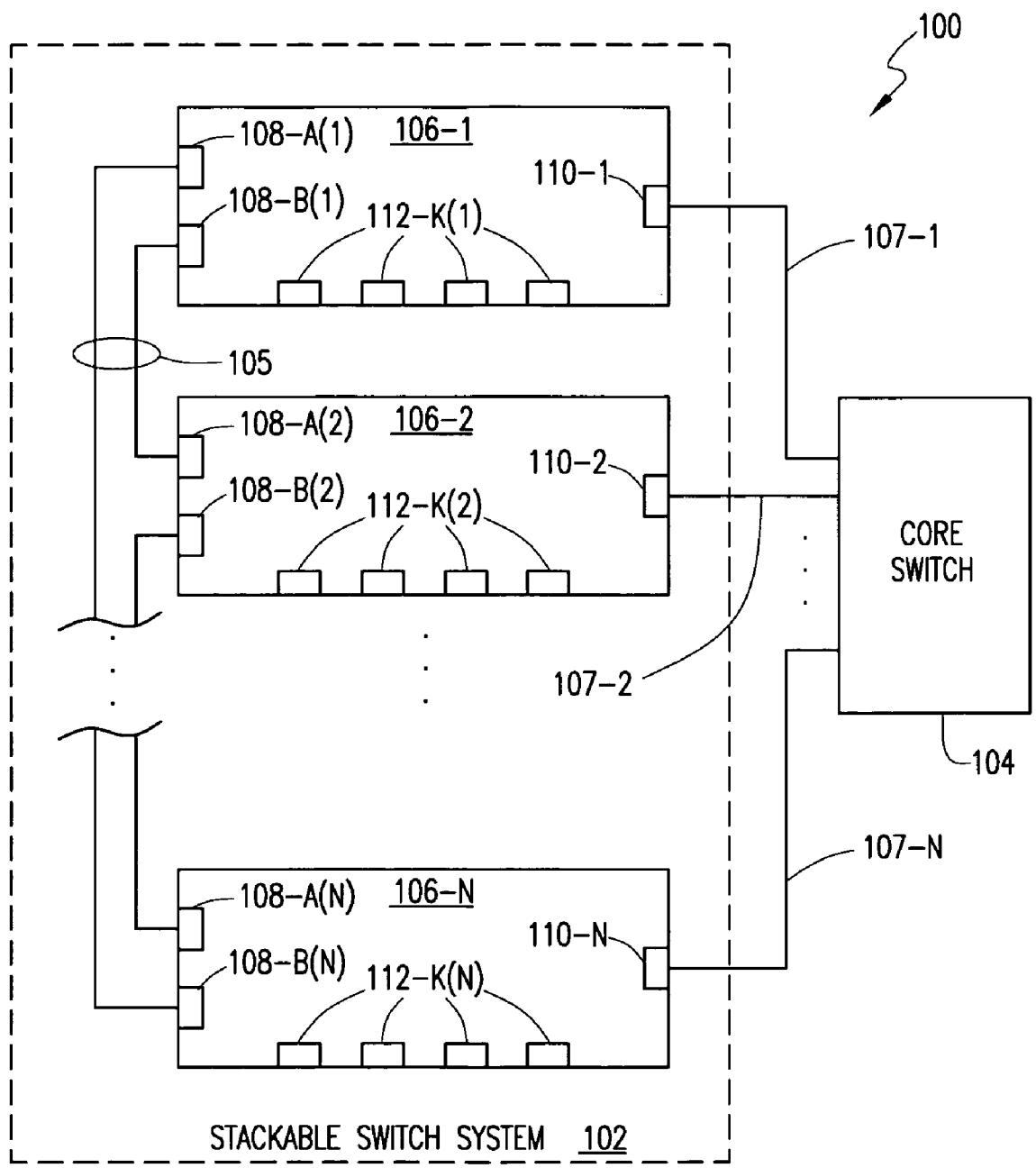
FIG. 1 is an exemplary Ethernet environment having a stackable Ethernet switch system (SESS) wherein an embodiment of the present invention may be implemented.

Embodiments of the invention will now be described with reference to various examples of how the embodiments can best be made and used. Like reference numerals are used throughout the description and several views of the drawings to indicate like or corresponding parts, wherein the various elements are not necessarily drawn to scale. Referring now to FIG. 1 in particular, shown therein is an exemplary Ethernet environment 100 having a stackable Ethernet switch system (SESS) 102 wherein an embodiment of the present invention may be implemented. At the outset, it should be recognized that Ethernet environment 100 is illustrative of any known or heretofore unknown Ethernet implementations where one or more Ethernet nodes having the well-known Layer 2 or Layer 2/3 functionality, or any other higher Layer functionality in accordance with the Open Systems Interconnect (OSI) model are interconnected together in a communications network. Accordingly, for instance, the Ethernet environment 100 may be a local area network (LAN) operating as an enterprise-level network, customer premises network, et cetera. By way of further illustration, the network environment 100 may be embodied as a dual- or multi-home application. In still further embodiments, the Ethernet environment 100 may comprise a metro Ethernet or an access network implementation.

A plurality of Ethernet switch elements 106-1 through 106-N (also referred to as slots or stack switches) form SESS 102 that operates as a scalable network node coupled to a core switch 104 of the Ethernet environment 100. In terms of configuration, the slots 106-1 to 106-N may be organized as a "stack" having any suitable topology such as, e.g., a chain topology, a ring topology or a star topology, interconnected with a stacking link 105. Each slot or switch element may support a plurality of Ethernet ports to facilitate network connectivity among the slots, with other network nodes and/ or devices, as well as core switch 104, which can be another Ethernet switch in one implementation. Accordingly, for purposes of the present disclosure, the Ethernet ports of a stack switch element may be grouped into three categories: (i) one or more core switch ("CS") ports operable to couple each stack switch element to core switch 104 via a respective core switch connection; (ii) one or more stack ports operable to effectuate stacking link 105 that interconnects the plural switch elements 106-1 to 106-N; and (iii) one or more ports operable to support connectivity to other network elements, nodes, and/or devices. As illustrated in FIG. 1, reference numerals 110-1 to 110-N refer to the CS ports corresponding to the N switch elements, respectively, whereby the plural switch elements 106-1 to 106-N are coupled to core switch 104 via core switch connections 107-1 to 107-N. A pair of stack ports are illustrated with respect to each switch element, e.g., ports 108-A(1) and 108-B(1) for switch element 106-1, ports 108-A(2) and 108-B(2) for switch element 106-2, and so on, to effectuate stacking link 105 that may be implemented in a twisted-pair cable or fiber optic cable arrangement. Likewise, each switch element is also provided with a number of network ports, e.g., ports 112-K(1) for switch element 106-1, ports 112-K(2) for switch element 106-2, and so on. Those skilled in the art will recognize that although each switch element is exemplified with the same number of ports, it need not be the case in any particular implementation.

As alluded to previously, in a preferred embodiment, stack switch elements 106-1 to 106-N are operable as multi-layer switches adapted to perform switching and routing operations with protocol data units (PDUs), preferably frames and packets, at Layer 2 (Data Link Layer) and Layer 3 (Network Layer) as defined by the OSI reference model, although they may also perform Layer 4-7 switching operations. Further, each switch element may generally be capable of functioning as a stand-alone network bridge, switch, or router. Where provided with an integrated stack manager protocol (ISMP), however, stack switch elements 106-1 to 106-N cooperate to emulate a single switching node more powerful than the mere aggregation of the individual switch elements in stand-alone operation. The resulting SESS node 102 is preferably adapted to provide scalable networking capability with enhanced fault tolerance and user convenience. In particular, SESS 102 can dynamically scale to incorporate additional stack switch elements, detect non-operational stack switches and stack links, dynamically route around—and in some cases through—the non-operational stack switches, and automatically configure the stack switch elements to produce a non-redundant identification scheme to facilitate inter-stack switch forwarding operations.

Figure 2:
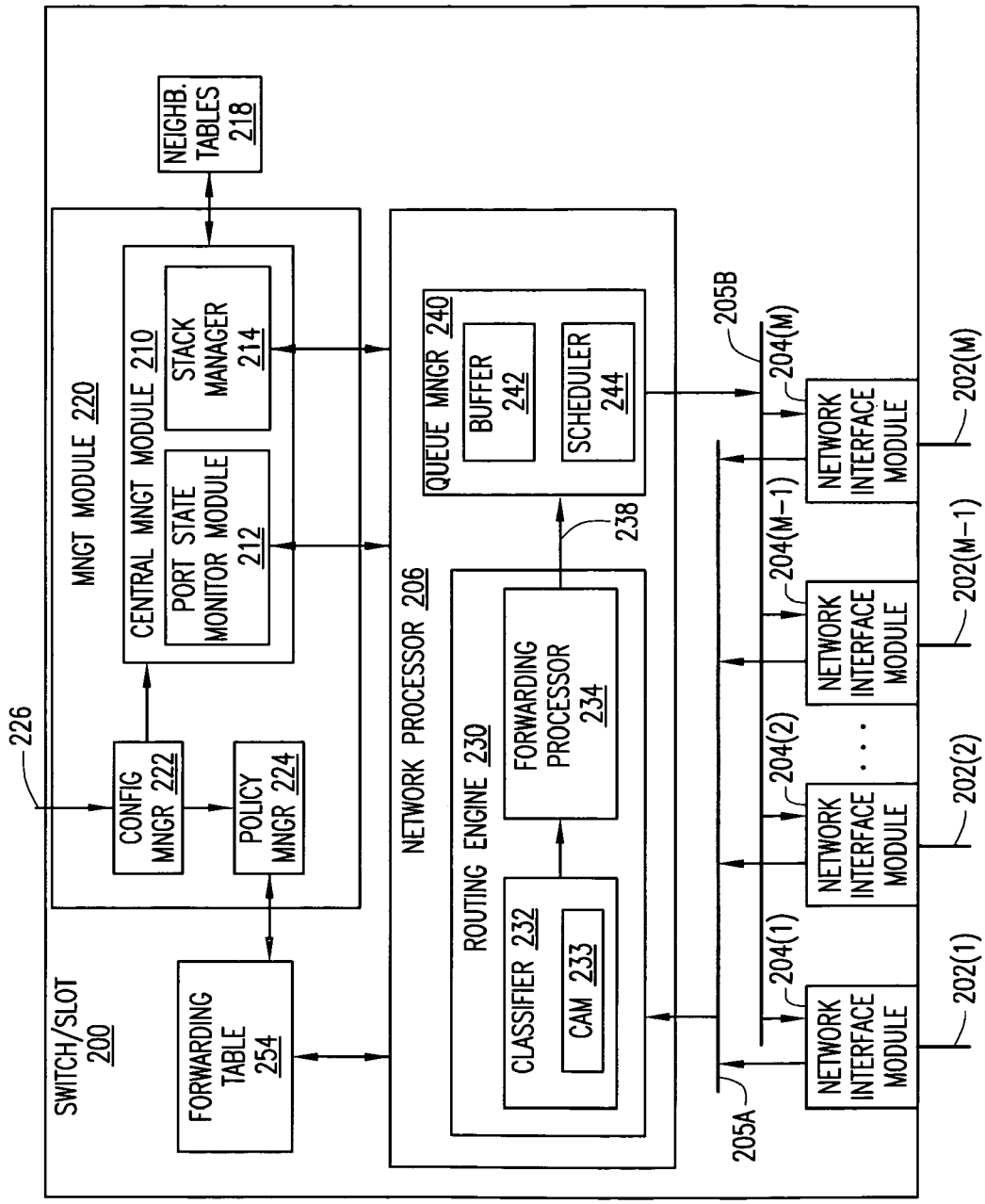
FIG. 2 is a block diagram of an Ethernet slot/element in the exemplary SESS of FIG. 1 in accordance with one embodiment.

FIG. 2 is a block diagram of an Ethernet slot/element in the exemplary SESS 102 of FIG. 1 in accordance with one. The exemplary slot 200, operable as any stack switch element 106-1 to 106-N of SESS 102, comprises one or more network interface modules (NIMs) 204(i), one or more switching controllers (i.e., network processors) 206, and a management module 220, all of which preferably cooperate to receive ingress data traffic and transmit egress data traffic via a plurality of Ethernet ports 202(i), i=1, 2, 3, . . . , M. For purposes of this embodiment, each of the plurality of the ports 202(i) may be treated as a duplex port adapted to receive ingress data and transmit egress data. Furthermore, ports 202(i) are illustrative of the three types of Ethernet ports, including the stacking ports as well as CS ports, described hereinabove with respect to FIG. 1. Accordingly, it is envisaged that a particular port 202(i) may transport both user data traffic as well as control management traffic if that port is operable as a stack port.

NIM elements 204(i) preferably include one or more physical layer interfaces and media access control (MAC) interfaces adapted to exchange PDUs, e.g., Ethernet frames and IP packets, via suitable wired or wireless network communications links (not shown). The NIMs associated with the ports operable as stack ports are, for example, standard Ethernet NIMs that are adapted to exchange PDUs, conventional data traffic with various compatible nodes, as well as inter-stack communications to other stack switches depending on the stack configuration mode. The ingress PDUs are conveyed from the plurality of NIMs to network processor/controller 206 by means of one or more ingress data buses 205A.

Similarly, the egress PDUs are transmitted from controller 206 to the plurality of NIMs via one or more egress data buses 205B.

In one implementation, management module 220 generally comprises a policy manager 224 for retaining and implementing traffic policies. The policies implemented by policy manager 224 are preferably based in part on Layer-2 and/or Layer-3 addressing information derived from source learning operations, route information received from other routing devices, and filtering rules uploaded by the network administrator via a configuration manager 222 using, for example, Simple Network Management Protocol (SNMP) messages 226. The traffic policies derived from source learning, other network nodes, and the administrator are made available to a routing engine 230 executed by network processor 206, and are collectively represented by a forwarding table 254.

In addition to the traffic policies, management module 220 further includes a port/stack management module (PSMM) 210 for implementing stack monitoring functionality and port state management functionality described in more detail below. PSMM 210 preferably comprises a port state monitor module 212 and a stack manager 214. The port state monitor module 212 is adapted to monitor the operational state of the stack ports using control traffic signals, e.g., Keep-Alive signals, and identify the presence of adjacent stack switches coupled to the stack ports of the switch element 200. PSMM 210 in a preferred embodiment may also include stack manager 214 adapted to participate in the elections that determine each stack switch's management responsibilities, process supervision messages used to monitor the status of the other switch elements, and if necessary, serve as a primary master switch (PMS) or a secondary master switch (SMS) whose responsibilities may include assigning unique element identifiers to one or more stack switches and assign processor identifiers to the network processors thereof. Additionally, stack manager 214 is adapted to determine the stack switch topology and process topology-related messages exchanged between the stack switch elements of SESS 102. In particular, stack manager 214 transmits SESS topology requests, transmits known SESS topology information to other stack switches, and maintain one or more local topology tables. In some embodiments, the functionality of port state monitor 212 and stack manager 214 may also include detecting the loss of an element, insertion of an additional element (causing a trap or exception to be generated), removal of an element from the stack, and determining the internal operational state of the PSMM.

Also, stack manager 214 in a preferred embodiment maintains and updates one or more stack switch neighbor tables 218, preferably one associated with each of the stack ports. A neighbor table 218 is a listing of those stack switches reachable through the associated stack port. In one implementation, the neighbor stack switches are recited in sequential order with the switch element immediately adjacent to the port listed first. As described previously, each element may be provided with two stack ports. Accordingly, each stack port of switch element 200 keeps a separate neighbor table 218 which lists all neighboring stack switches reachable through that stack port. As a result, if the topology of SESS 102 is a ring configuration, both neighbor tables 218 have the same list of neighboring stack switches but in reverse order.

Continuing to refer to FIG. 2, network processor 206 is capable of, but not limited to, Layer 2 and Layer 3 switching operations as defined in the OSI reference model. Examples of Layer 2 protocols for operably coupling ports 202(1) to 202(M) to respective wired and/or wireless communications links include the Institute of Electrical and Electronics Engineers (IEEE) 802.3 and IEEE 802.11 standards. Likewise, examples of Layer 3 protocols include Internet Protocol (IP) version 4 defined in Internet Engineering Task Force (IETF) Request for Comment (RFC) 791 and IP version 6 defined in IETF RFC 1883.

Network processor 206 preferably comprises a routing engine 230 and a queue manager 240. In one exemplary implementation, routing engine 230 comprises a classifier 232 that receives ingress PDUs from data bus 205A, inspects one or more fields of the PDUs, classifies the PDUs into one of a plurality of flows using a content addressable memory (CAM) 233, and retrieves forwarding information from forwarding table 254 stored in memory. The forwarding information retrieved from forwarding table 254 preferably includes, but is not limited to, a flow identifier used to specify those forwarding operations necessary to prepare the particular PDU for egress, where the flow identifier may include the next-hop address and class of service (CoS) or Quality of Service (QoS) provisions. A forwarding processor 234 receives the ingress PDUs with the associated forwarding information and executes one or more forwarding operations prior to transmission to the appropriate egress port or ports. The forwarding operations preferably include but are not limited to header transformation for re-encapsulating data, VLAN tag pushing for appending one or more VLAN tags to a PDU, VLAN tag popping for removing one or more VLAN tags from a PDU, QOS management for reserving network resources, billing and accounting for monitoring customer traffic, Multi-Protocol Label Switching (MPLS) management, selective filtering of PDUs, access control, higher-layer learning including Address Resolution Protocol (ARP) control, and so on.

After being processed by forwarding processor 234, the PDUs are passed to and stored in queue manager 240 until bandwidth is available to transmit the PDUs to the appropriate egress port. In particular, the egress PDUs are buffered in one or more priority queues in buffer 242 until they are transmitted by scheduler 244 to an egress port via data bus 205B. Additional details regarding the network processor implementation may be found in one or more of the commonly owned co-pending patent application(s) cross-referenced hereinabove.

Figure 3A:
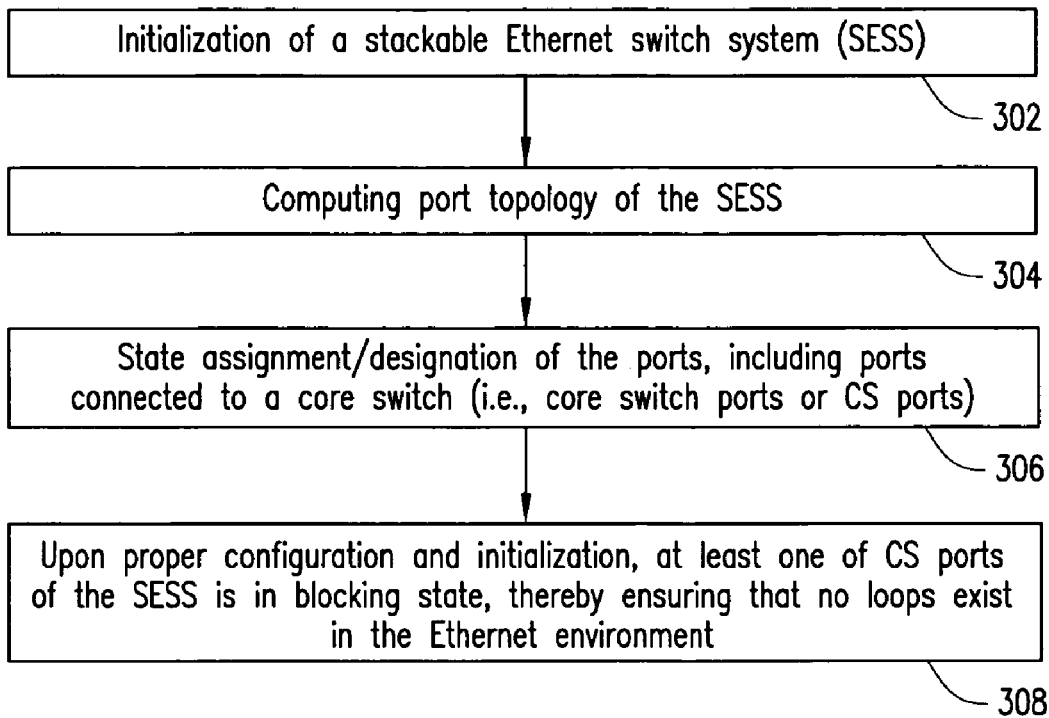
FIGS. 3A and 3B are flow charts relating to the functionality of a SESS according to one embodiment.
Figure 3B:
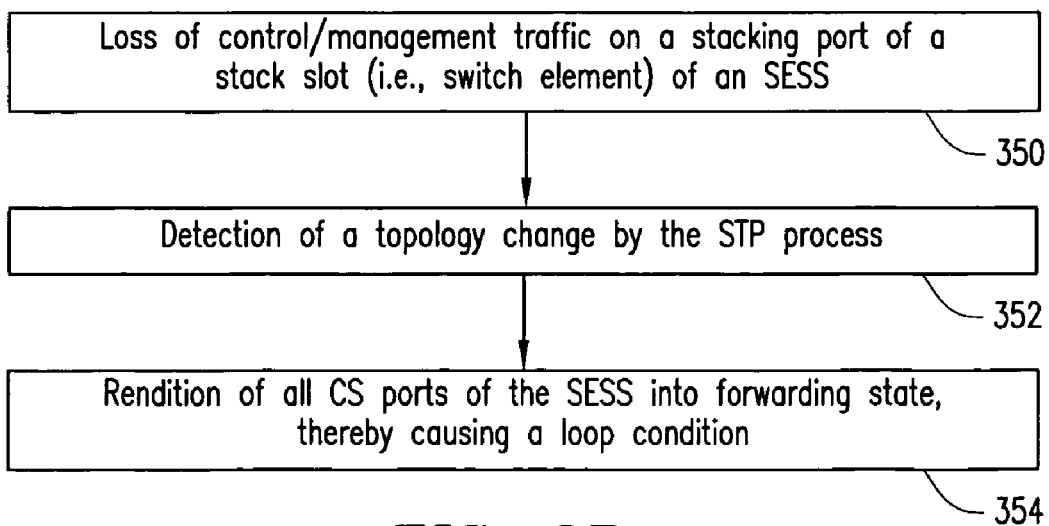

FIGS. 3A and 3B are flow charts relating to the functionality of a SESS according to one embodiment. As shown in FIG. 3A, a SESS node, e.g., SESS 102 having stack switch elements 200 described in detail above, is initialized in accordance with known procedures (block 302), whereupon the port topology of the SESS is established responsive to the execution of a suitable Spanning Tree Protocol (STP) (block 304). Further, state information of the various ports in the SESS, including the CS ports connected to a core switch, is assigned and designated (block 306). Upon proper configuration and initialization, it is ensured that at least one of the CS ports of the SESS is in a blocking state while the other CS ports are in a forwarding state such that loops of data traffic are avoided when the SESS is initially brought online (block 308).

After being processed by forwarding processor 234, the PDUs 238 are passed to and stored in queue manager 240 until bandwidth is available to transmit the PDUs to the appropriate egress port. In particular, the egress PDUs are buffered in one or more priority queues in buffer 242 until they are transmitted by scheduler 244 to an egress port via data bus 205B. Additional details regarding the network processor implementation may be found in one or more of the commonly owned co-pending patent application(s) cross-referenced hereinabove.

Figure 4:
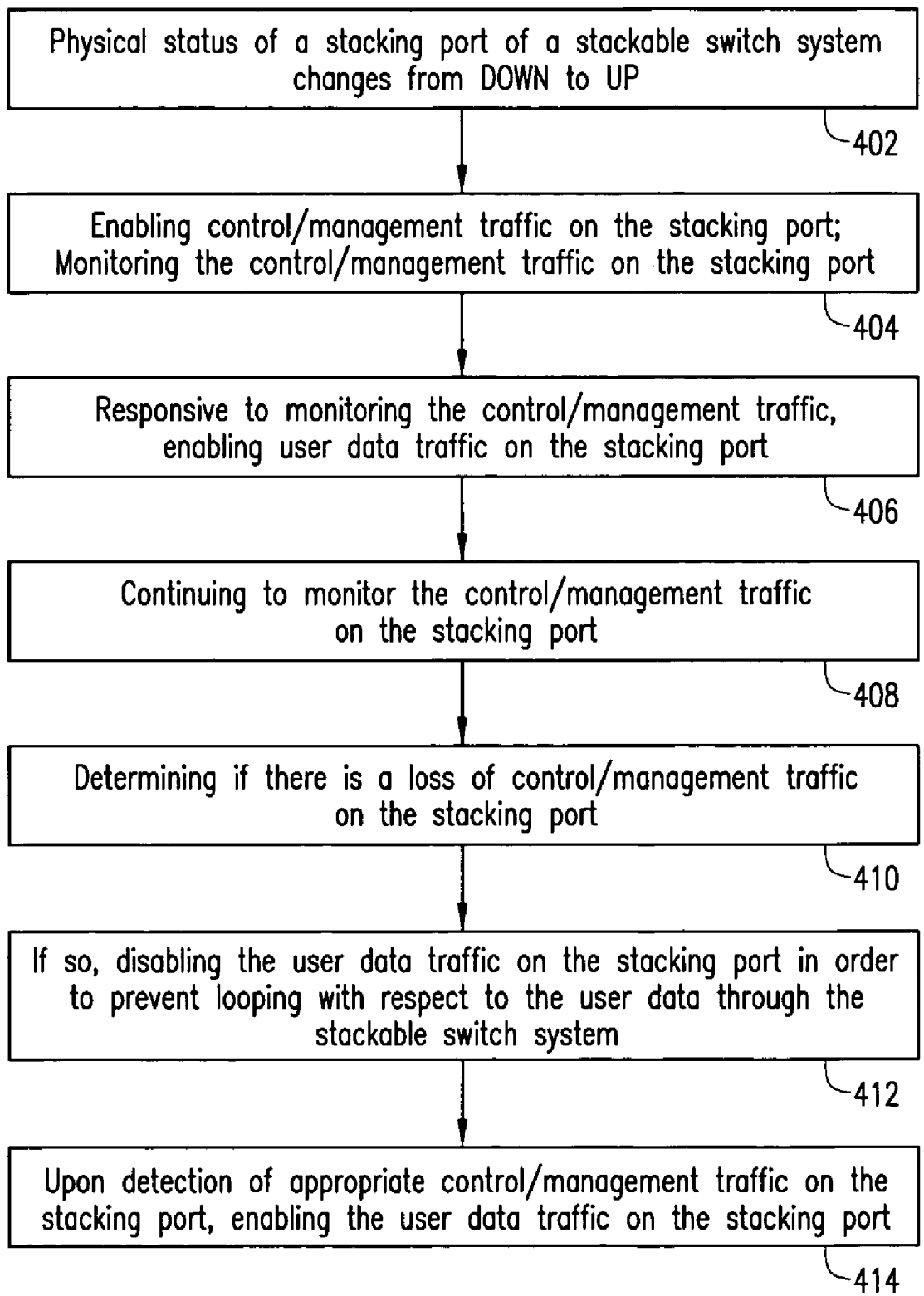
FIG. 4 is a flowchart relating to an embodiment of a loop prevention scheme of the present patent disclosure.

FIG. 4 is a flowchart relating to an embodiment of a loop prevention scheme of the present patent disclosure operable with exemplary SESS 102. It will be realized that one or more steps set forth in the flow chart of FIG. 4 may be implemented in software (e.g., instructions on a computer-readable medium), hardware, firmware, or in any combination thereof, and may be embodied in one or more suitable logic blocks of the plurality of stack switch elements 200 of the SESS that have been described in detail hereinabove. Additionally or alternatively, some of the steps and operations may be optional and thus may not be required in all implementations and embodiments.

Where there is a loss of control management traffic on a stacking port of a stack switch element of the SESS (block 350), the STP process detects a topology change (block 352). This loss condition may be engendered in a number of situations even where the stacking link connecting the stack switch elements physically stays up: (i) network processor of an adjacent stack switch element may be dysfunctional or defective; (ii) the adjacent stack switch element may not reboot properly; and/or (iii) existence of certain anomalous conditions relating to the Application Specific Integrated Circuits (ASICs) of the adjacent stack switch element. Responsive to detecting the topology change, the STP process associated with the SESS renders all CS ports into the forwarding state (block 354). That is, even the ports initialized in the blocking state are caused to go into the forwarding state. As a result, a loop condition is created in the Ethernet environment that can cause data traffic flooding.

The status and condition of the control traffic on the stack ports continues to be monitored by means of logic associated with PSMM 210 (block 408). When a stack port of a particular switch element is physically up but the control traffic messages (e.g., Keep Alive messages) are not received at that port from a neighboring switch element, a determination is made that there is a loss of control traffic from the neighboring switch element (block 410). In one exemplary implementation, the loss condition may be determined based on detecting that Keep Alive messages from the neighboring switch element are not received after a period of time, which may be predetermined or configurable to be dynamically variable, etc. Responsive to the determination that there is a loss of control traffic on the stacking port, user data traffic on that stacking port is disabled while continuing to keep the control/management traffic path open (block 412). Accordingly, the disabling of user data traffic on the stacking port operates to prevent the looping of the data in the network environment in which the SESS is disposed. Upon detection of appropriate control traffic on the stacking port from the neighboring element (due to, e.g., rebooting by the network operator or administrator), the user data traffic may be re-enabled or resumed on the stacking port (block 414).

It is believed that the operation and construction of the present invention will be apparent from the Detailed Description set forth above. While the exemplary embodiments of the invention shown and described have been characterized as being preferred, it should be readily understood that various changes and modifications could be made therein without departing from the scope of the present invention as set forth in the following claims.

What is claimed is:

1. A loop prevention method operable in a stackable Ethernet switch system (SESS) having at least two stackable switch elements, wherein each switch element includes at least one stacking port and at least one core switch port such that said at least one core switch port is operable to be connected to a core switch, said loop prevention method comprising:
monitoring control management traffic on said at least one stacking port of each of said stackable switch elements;
upon determining that there is a loss of said control management traffic on a stacking port of a particular switch element of said SESS, disabling user data traffic on said stacking port of said particular switch element while continuing to keep a control/management traffic path open to avert a loop condition involving said user data traffic in said SESS; and
enabling said user data traffic on said stacking port of said particular switch element upon detecting that said control management traffic on said stacking port has resumed.

2. The loop prevention method as recited in claim 1, wherein said loss of said control management traffic on said stacking port of said particular switch element is determined based on detecting that "Keep Alive" messages from a neighboring switch element connected to said particular switch element are not received after a period of time.

3. The loop prevention method as recited in claim 2, wherein said period of time is predetermined.

4. The loop prevention method as recited in claim 2, wherein said period of time is configurably variable.

5. The loop prevention method as recited in claim 1, wherein said monitoring is performed after initial configuration of said SESS in which at least one of said core switch ports is rendered into a blocking state upon coupling to said core switch.

6. The loop prevention method as recited in claim 1, wherein said control management traffic is monitored on each of said stackable switch elements by a stacking port traffic logic block associated with each stackable switch element.

7. A loop prevention apparatus operable in a stackable Ethernet switch system (SESS) having at least two stackable switch elements, wherein each switch element includes at least one stacking port and at least one core switch port such that said at least one core switch port is operable to be connected to a core switch, said loop prevention apparatus comprising:
means for monitoring control management traffic on said at least one stacking port of each of said stackable switch elements;
means, operable responsive to determining that there is a loss of said control management traffic on a stacking port of a particular switch element of said SESS, for disabling user data traffic on said stacking port of said particular switch element while continuing to keep a control/management traffic path open to avert a loop condition involving said user data traffic in said SESS; and
means for enabling said user data traffic on said stacking port of said particular switch element upon detecting that said control management traffic on said stacking port has resumed.

8. The loop prevention apparatus as recited in claim 7, wherein said loss of said control management traffic on said stacking port of said particular switch element is determined based on detecting that "Keep Alive" messages from a neighboring switch element connected to said particular switch element are not received after a period of time.

9. The loop prevention apparatus as recited in claim 8, wherein said period of time is predetermined.

10. The loop prevention apparatus as recited in claim 8, wherein said period of time is configurably variable.

11. The loop prevention apparatus as recited in claim 8, wherein said means for monitoring said control management traffic is operable after initial configuration of said SESS in which at least one of said core switch ports is rendered into a blocking state upon coupling to said core switch.

12. A stackable Ethernet switch system (SESS), comprising:

at least two stackable switch elements, wherein each switch element includes at least one stacking port and at least one core switch port such that said at least one core switch port is operable to be connected to a core switch;

logic implemented with each stackable switch element for monitoring control management traffic on said at least one stacking port of each of said stackable switch elements;

logic implemented with each stackable switch element, operable responsive to determining that there is a loss of said control management traffic on a stacking port of a particular switch element of said SESS, for disabling user data traffic on said stacking port of said particular switch element while continuing to keep a control/management traffic path open to avert a loop condition involving said user data traffic in said SESS; and logic implemented with each stackable switch element for enabling said user data traffic on said stacking port of said particular switch element upon detecting that said control management traffic on said stacking port has resumed;

wherein the logic comprises at least one of a computer-readable medium, hardware, or firmware of each stackable switch element.

13. The stackable Ethernet switch system as recited in claim 12, wherein said loss of said control management traffic on said stacking port of said particular switch element is determined based on detecting that "Keep Alive" messages from a neighboring switch element connected to said particular switch element are not received after a period of time.

14. The stackable Ethernet switch system as recited in claim 13, wherein said period of time is predetermined.

15. The stackable Ethernet switch system as recited in claim 13, wherein said period of time is configurably variable.

16. The stackable Ethernet switch system as recited in claim 12, wherein said logic for monitoring said control management traffic is operable after initial configuration of said SESS in which at least one of said core switch ports is rendered into a blocking state upon coupling to said core switch.

17. The stackable Ethernet switch system as recited in claim 12, wherein said stackable switch elements are arranged in a star configuration.

18. The stackable Ethernet switch system as recited in claim 12, wherein said stackable switch elements are arranged in a ring configuration.

19. The stackable Ethernet switch system as recited in claim 12, wherein said stackable switch elements are arranged in a chain configuration.

\* \* \* \* \*